United States Patent
Bowen-Huggett

(10) Patent No.: US 11,847,052 B2
(45) Date of Patent: Dec. 19, 2023

(54) MEMORY ALLOCATION APPARATUS AND METHOD

(71) Applicant: Sony Interactive Entertainment Inc., Tokyo (JP)

(72) Inventor: Paul Bowen-Huggett, Bristol (GB)

(73) Assignee: Sony Interactive Entertainment Inc., Tokyo (JP)

( * ) Notice: Subject to any disclaimer, the term of this patent is extended or adjusted under 35 U.S.C. 154(b) by 280 days.

(21) Appl. No.: 16/321,063

(22) PCT Filed: Jul. 28, 2017

(86) PCT No.: PCT/GB2017/052212
§ 371 (c)(1),
(2) Date: Jan. 28, 2019

(87) PCT Pub. No.: WO2018/029443
PCT Pub. Date: Feb. 15, 2018

(65) Prior Publication Data
US 2019/0171565 A1    Jun. 6, 2019

(30) Foreign Application Priority Data
Aug. 12, 2016 (GB) .................................. 1613844

(51) Int. Cl.
*G06F 12/06*    (2006.01)
*G06F 12/1009*    (2016.01)
(Continued)

(52) U.S. Cl.
CPC ............ *G06F 12/06* (2013.01); *G06F 9/5077* (2013.01); *G06F 12/0292* (2013.01); *G06F 12/109* (2013.01); *G06F 12/1009* (2013.01)

(58) Field of Classification Search
CPC .... G06F 12/06; G06F 12/1009; G06F 9/5077; G06F 12/0292; G06F 12/109
See application file for complete search history.

(56) References Cited

U.S. PATENT DOCUMENTS 6,442,664 B1 * 8/2002 Maynard ............. G06F 12/1027
711/203
6,446,182 B1  9/2002 Bouraoui
(Continued)

OTHER PUBLICATIONS

International Search Report and Written Opinion for corresponding PCT Application No. PCT/GB2017/052212, 12 pages, dated Oct. 30, 2017.
(Continued)

*Primary Examiner* — David Yi
*Assistant Examiner* — Alan Otto
(74) *Attorney, Agent, or Firm* — Matthew B. Dernier, Esq.

(57) ABSTRACT

A method of memory allocation in a host computer includes: allocating one or more regions of physical working memory for use by an application, the regions individually including contiguous physical memory segments, but the regions not necessarily being contiguous between themselves; generating a segment address table having at least as many entries as the total number of physical memory segments allocated to the application; populating entries of the segment address table sequentially and contiguously with the physical addresses of the physical memory segments across the or each region in order; presenting to the application a contiguous virtual addressable space having at least as many virtual memory segments as the total number of physical memory segments allocated to the application; and mapping from virtual memory addresses to physical memory addresses by reference to the segment address table.

13 Claims, 2 Drawing Sheets

(51) Int. Cl.
    *G06F 9/50*     (2006.01)
    *G06F 12/02*     (2006.01)
    *G06F 12/109*     (2016.01)

(56) References Cited

U.S. PATENT DOCUMENTS

| | | |
|---|---|---|
| 2004/0064671 A1 | 4/2004 | Patil |
| 2009/0254728 A1 | 10/2009 | Kamensky |
| 2010/0058016 A1 | 3/2010 | Nikara |
| 2015/0220452 A1* | 8/2015 | Purkayastha ........ G06F 12/1009 |
| | | 711/103 |
| 2016/0055082 A1 | 2/2016 | Kim |
| 2016/0179432 A1* | 6/2016 | Niwa .................... G06F 3/0638 |
| | | 711/203 |

OTHER PUBLICATIONS

Search Report for corresponding GB application No. GB1613844.8, 4 pages, dated Jan. 23, 2017.

* cited by examiner

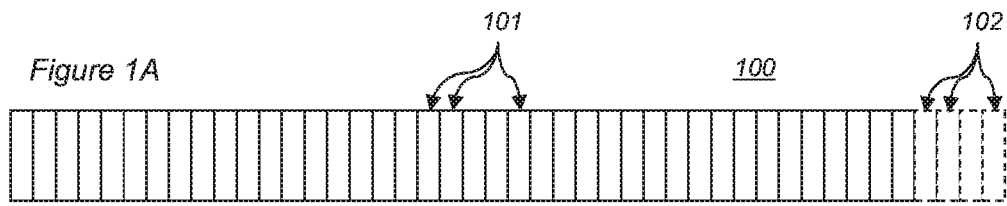
Figure 1A
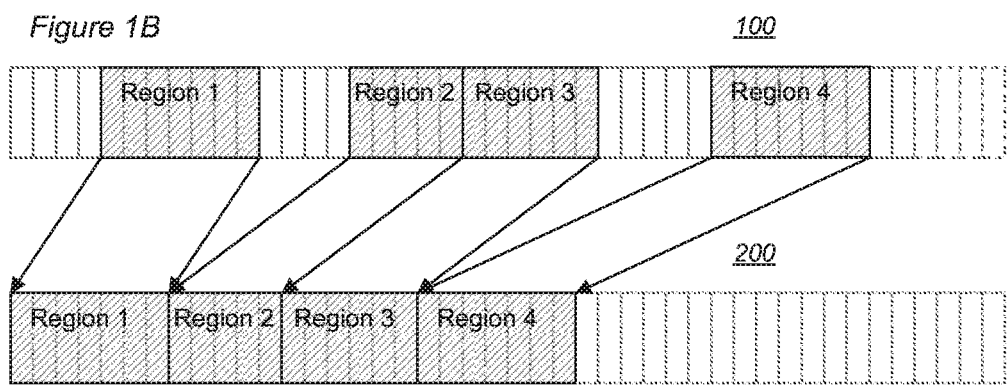
Figure 1B
Figure 1C
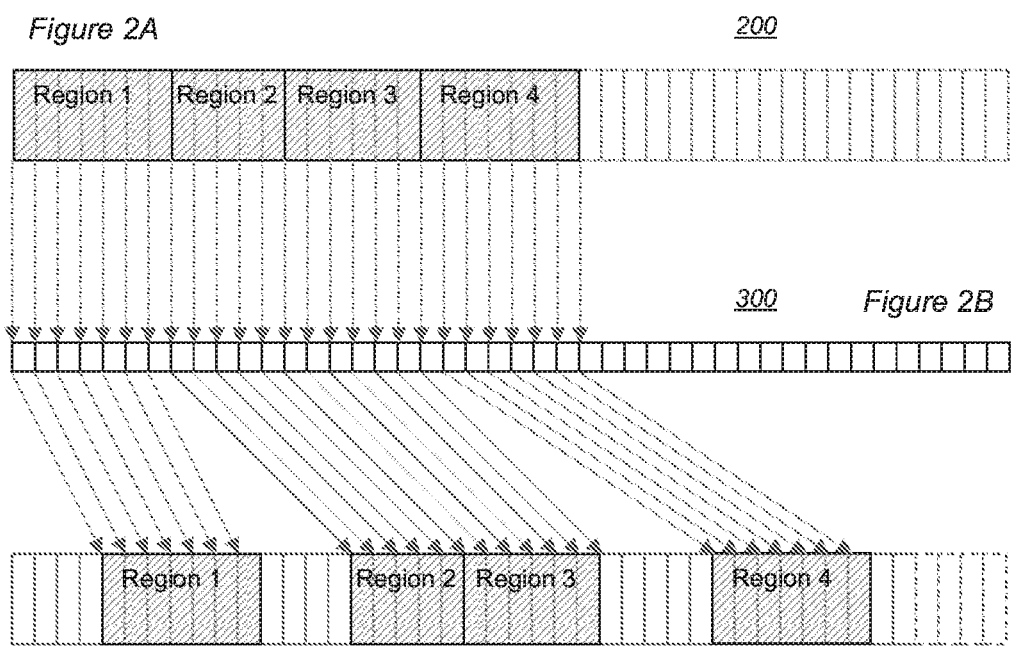
Figure 2A
Figure 2B
Figure 2C

MEMORY ALLOCATION APPARATUS AND METHOD

FIELD OF THE INVENTION

The present invention relates to a memory allocation apparatus and method.

BACKGROUND

In computing, many applications perform better when they have access to contiguous memory; for example a database or search engine may perform a large number of data record retrievals and updates, and so having data records organised in contiguous memory can increase the effective speed of read and write access by the host computer, and moreover also enables the use of more efficient data structures and meta data within the database itself that assist with its performance.

SUMMARY

However, typically such an application does not have the authority to allocate memory by itself, and so it is dependent upon memory allocation by the underlying operating system—which typically balances the requirements of multiple applications at the same time and may not consistently elect to allocate the desired amount of contiguous memory to the application.

Furthermore, for applications such as the above-mentioned database search engine, as new records are created, additional memory may be required; however in normal operation it is unlikely that the operating system would assign additional memory contiguous to previously assigned memory when this happens. Meanwhile, it would be inefficient for the host computer and operating system overall if the application speculatively requests a larger amount of contiguous memory than is needed at the outset in order to accommodate the possibility of new records being added in a given session.

Accordingly, there is a need to improve the assignment of transient memory to applications that benefit from access to contiguous memory.

The present invention aims to alleviate or mitigate this need.

BRIEF DESCRIPTION OF THE DRAWING

Embodiments of the present invention will now be described by way of example with reference to the accompanying drawings, in which:

FIGS. 1A-1C are schematic diagrams illustrating a mapping of regions of physical working memory on to a virtual addressable space in accordance with an embodiment of the present invention.

FIGS. 2A-2C are schematic diagrams illustrating a relationship between a virtual addressable space, a segment address table and a physical working memory in accordance with an embodiment of the present invention.

DETAILED DESCRIPTION

Figure 3:
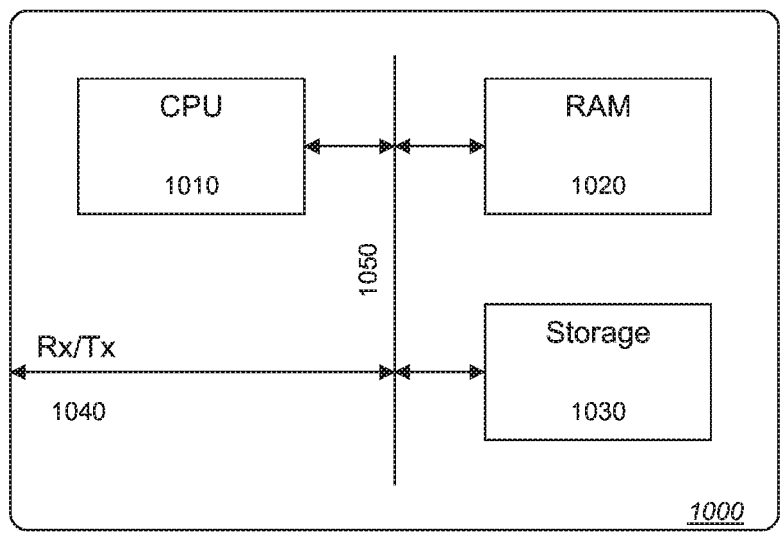
FIG. 3 is a schematic diagram of a computer in accordance with an embodiment of the present invention.

A memory allocation apparatus and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Physical Space and Virtual Addressable Space

Referring now to FIGS. 1A-1C, in an embodiment of the present invention, a method is provided for mapping disconnected spaces in memory onto one contiguous space for applications that cannot create one contiguous space themselves, and for applications that need to expand such a space during ongoing operations.

FIG. 1A illustrates a physical memory space 100 used as working memory by a host computer (typically RAM, but potentially a temporary page file on a hard disk or flash drive, which is used when there is insufficient RAM for the computer's needs). The physical memory is partitioned into segments 101, typically of equal size to each other. The size or dimension of a segment can vary depending on the particular physical implementation of the memory and/or logical division by an operating system.

In the example of FIG. 1A, the total possible physical memory space 100 is illustrated; this comprises the actual physical memory space formed of segments 101, and optionally potential memory space that would comprise additional segments 102. Such optional potential memory space may be provided for example in a computer that supports hot-expandable memory, where an additional memory chip or card can be plugged into the system to provide additional memory if needed without shutting down the system first. However it will be appreciated that for many systems, in practice only pre-existing physical memory formed of segments 101 will be available. In the case of a page file, the optional potential memory may be the difference between the existing page file size and a maximum page file size permitted by the operating system.

FIG. 1B illustrates the same physical memory space 100, but additionally shows four regions (explained later herein), each region comprising a physically contiguous set of segments. However, the regions themselves may or may not be physically contiguous (in the illustrated example regions two and three are physically contiguous, but regions one and two, and regions three and four, are not).

Finally, FIG. 1C illustrates an addressable space 200 presented to an application running on the host computer. The addressable space is presented to the application as a single continuous space. The potential size of the addressable space is equal to the physical memory space, optionally including the potential memory space.

Notably however, the four regions of physically continuous segments in the physical memory space are mapped to the addressable space to form a contiguous group of regions. It will be appreciated that whilst they are shown as preferably beginning at the start of the addressable space in FIG. 1C, this is non-limiting.

This mapping is facilitated by a segment address table.

Segment Address Table

In a conventional system, when mapping data from a file to working memory (such as a database file, by way of a non-limiting example), it is not possible to predict the addresses in working memory that the operating system will assign; however, efficient databases and other applications may wish to retain reliable address pointers within their data structures, which therefore could become obsolete with each successive loading of the database.

By contrast, referring now to FIGS. 2A to 2C, in embodiments of the present invention a segment address table 300 is provided that holds the physical address of each segment of physical working memory. Optionally this table is equal in size to the maximum possible number of physical segments and hence may contain entries for potential memory segments 102, although these addresses may be left blank when for example the expansion memory is not installed. Alternatively, the table may comprise entries only for the existing physical and/or page file segments.

The segment address table relates the addressable space to the physical space as follows.

The first entry in the segment address table corresponds to the first segment in the virtual addressable space, and that entry contains a pointer to the start address of the corresponding allocated physical segment in physical memory, and so on for each populated entry in the table. Hence the entries in the segment address table 300 (shown in FIG. 2B) correspond to segments in the addressable space 200 (shown in FIG. 2A, which is identical to FIG. 1C), as illustrated by the arrows between the virtual addressable space and the segment address table, and these entries each contain a pointer to the physical address of the corresponding segment allocated in physical memory 100 (shown in FIG. 2C, which is identical to FIG. 1B), as illustrated the arrows between the segment address table and the physical memory.

In operation, a memory manager (not shown) intercepts memory requests such as read and write instructions from the application; consequently when the application requests N contiguous bytes of working memory, the memory manager relays this request to the operating system. The operating system then assigns working memory to the memory manager (and/or the application), which may be a single contiguous region at an arbitrary starting segment in physical memory, or it may be two or more contiguous or non-contiguous regions at arbitrary starting segments in the physical memory.

In either case, the memory manager populates the segment address table with the physical addresses of the segments in the or each region in order, starting with the first element of the table and progressing through the table sequentially and contiguously to create a mapping to the physical space in which contiguous segments of the virtual addressable space are associated via the segment address table with contiguous segments within regions of the physical memory that may or may not themselves be contiguous, as per FIGS. 2A-2C.

Subsequently, if a database application requests that a database file is loaded into working memory, the operating system loads it into the physical memory allocated to it or the memory manager on its behalf, and hence potentially across several discontinuous regions of physical memory. However, the memory manager will provide the starting address of the database file as the start address of the virtual addressable memory to the database application.

Consequently each time the database application loads the database file, it will appear to be in held a contiguous block of working memory at the same starting address. Therefore address dependent data and pointer structures within the database file can be robust and persistent across sessions irrespective of the real state of working memory in the host computer.

The memory manager translates virtual addresses from the database application to physical working memory using a segment index and offset scheme. Given that each segment is the same size (for example, 1024 bytes, although in practice any size, for example 1 GB), then an exact address in the virtual addressable memory can be translated into a segment number by dividing the address by the segment size (or optionally using bit truncation on the address to obtain a segment number, if the segment sizes permit), and using the remainder as an offset. The segment number is then used to identify the corresponding entry in the segment address table, from which the start address of the corresponding physical memory segment is obtained. Finally the offset is then added to reveal the corresponding physical address. Optionally, in the event that the operating system does not allocate regions on a segment-by-segment basis, but begins a region mid-segment, an additional region offset corresponding to the address difference between the start of the segment and the start of a region may also be applied.

In this way the memory manager can transparently present the or each region of assigned physical working memory as a contiguous virtual addressable workspace for operations of the application.

Potentially, the memory manager may provide this facility for multiple applications. In principle more than one application could use the same segment address table, but this risks the introduction of similar problems to those encountered in the physical working memory, such as fragmentation in the table as different applications change memory requirements, or arbitrary starting positions within the virtual address space depending on the size of memory allocation given to proceeding applications.

Accordingly, in an embodiment of the present invention the memory manager uses a separate segment address table and virtual addressable space for each application. Consequently each application has access to a working memory that starts at the first address of its own respective virtual addressable space, and this is mapped to the actual physical space assigned to it by the operating system using a respective segment address table. Because the actual physical space is assigned by the operating system, which has visibility of all applications and assigns physical memory in a non-overlapping manner, the memory manager does not need to check for clashes in entries between different segment address tables. The memory manager may be provided for example by the operating system.

Furthermore, because the operating system manages the physical space, respective memory managers can be employed for respective applications to manage their own segment address table and virtual addressable space, each memory manager having no requirement to be aware of other memory managers, segment address tables or virtual addressable spaces operating on the host computer. The respective memory managers may be provided for example by the operating system, or by respective programs.

Example Uses i. An always-on computer may require hot-expandable memory, wherein the memory size can be expanded without turning off the existing memory. In this scenario, a region may correspond to a memory chip or card, and comprises segments of the same size as the resident memory, for example 1 MB or 1 GB. Accordingly, the segment address table held by the computer operating system can be updated when the new region of segments is physically added to the system. Once the segment address table is updated, the computer, operating system and memory manager can start to use the additional available physical memory to support virtual addressable space.

ii. A database application may require data records to be contiguous in memory for fast read and write access and/or consistent structuring. The size of the database is not initially known. Typically it is more beneficial for the database to start small and be allowed to grow as more records are added, as it minimises the time to transfer the database across a network for example, and the time to read/write a hard disk. Consequently, as the database approaches full occupation of its currently assigned regions, a new region can be assigned to it, and added to the virtual address space. It will be appreciated that the next time the database is used, different regions of physical memory may be allocated to it, but the virtual address space will be the same.

iii. An FPGA design may not fit into a single area on physical FPGA hardware. To make the design fit on the hardware, the system may find the required space in disconnected regions, and route any required connections between the discredited regions, transparent to the high level design, by use of the segment address table. The disconnected regions maybe on the same physical chip may be on separate physical chips. The high-level FPGA design tools can create a design in an unallocated address space, and once the tools are asked to map and route the design, the system can optimise the regions and segments according to the available hardware. This can allow larger designs to flexibly work across different hardware.

Hardware

Referring now to FIG. 3, a conventional computer 1000 may comprise a central processing unit (CPU) 1010, working memory 1020 (e.g. RAM), storage 1030 (e.g. a hard disk, flash memory or other persistent storage means), and optionally a communication transceiver 1040 (for example a network port), all linked by a bus 1050. Example computers include a server, a PlayStation 4® videogame console, and a console developer kit.

The CPU will typically operate as the memory manager under suitable software instruction. The segment allocation table will typically be held in RAM while it is in use by the memory manager. Applications and persistent data, such as a database and database file, or FPGA design tools and a design are held in long-term storage on the hard disk or other persistent storage means until needed for use, in which case the application and some or all of the data is transferred to RAM (and/or page file, as noted previously herein).

Once in RAM, requests by the application for access to its working memory are handled by the memory manager, whether this is integral to the operating system, a separate application, or part of the requesting application itself.

Consequently it will be appreciated that the methods and techniques described herein may be carried out on conventional hardware suitably adapted as applicable by software instruction or by the inclusion or substitution of dedicated hardware. Example hardware includes videogame consoles and console development platforms, PCs and servers.

Summary Embodiments

Figure 4:
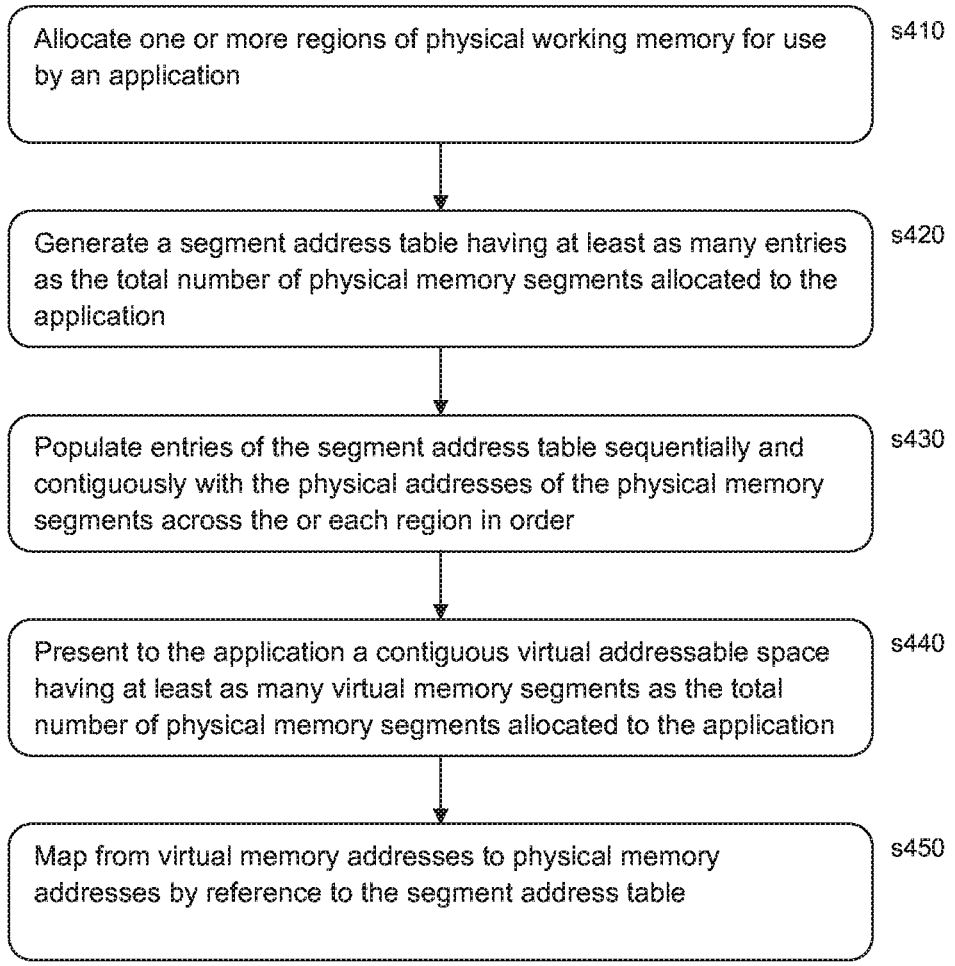
FIG. 4 is a flow diagram of a method of memory allocation in accordance with an embodiment of the present invention.

Referring now to FIG. 4, in a summary embodiment of the present invention a method of memory allocation in a host computer comprises in a first step s410, allocating one or more regions of physical working memory for use by an application (i.e. working memory for the application to use during its operation, as opposed to working memory occupied by the application itself), the regions individually comprising contiguous physical memory segments, but the regions not necessarily being contiguous between themselves; in a second step s420, generating a segment address table having at least as many entries as the total number of physical memory segments allocated to the application; in a third step s430, populating entries of the segment address table sequentially and contiguously with the physical addresses of the physical memory segments across the or each region in order; in a fourth step s440, presenting to the application a contiguous virtual addressable space having at least as many virtual memory segments as the total number of physical memory segments allocated to the application; and in a fifth step s450, mapping from virtual memory addresses to physical memory addresses by reference to the segment address table.

In an instance of the summary embodiment, in the step of populating the segment address table, the first entry of the segment address table is populated with the address of the first physical memory segment of the first region.

In an instance of the summary embodiment, in the step of mapping from virtual memory addresses to physical memory addresses by reference to the segment address table comprises the steps of determining the virtual memory segment comprising the virtual memory address and calculating a virtual address offset with respect to that segment, reading the physical memory addresses held in the entry of the segment address table corresponding to the determined virtual memory segment, and adding the calculated virtual address offset to that physical memory address.

In an instance of the summary embodiment, if one or more regions of physical working memory are allocated starting at an address other than the start address of a physical memory segment, then the method comprises the steps of calculating a physical starting address offset with respect to the start address of the physical memory segment for the or each region, and adding the respective physical starting address offset to the calculated physical memory address in a respective region.

In an instance of the summary embodiment, the segment address table comprises fields for all available physical memory segments.

In an instance of the summary embodiment, the segment address table comprises fields for potential physical memory segments.

In an instance of the summary embodiment, the method comprises the steps of requesting additional working memory for the application, allocating one or more new regions of physical working memory for use by the application, the new regions individually comprising contiguous physical memory segments (but new the regions not necessarily being contiguous between themselves), and populating entries of the segment address table sequentially and contiguously with the physical addresses of the physical memory segments across the or each new region in order starting with the entry immediately following the last entry in the segment address table corresponding to the existing allocated regions of physical working memory.

In an instance of the summary embodiment, the method comprises the step of selecting the same virtual start address for the virtual address space each time the application is allocated physical working memory.

In an instance of the summary embodiment, for respective applications with respective allocated physical working memory, each application has a respective segment address table and virtual addressable space.

In another summary embodiment of the present invention, a memory allocation apparatus (such as computer 1000, a PlayStation 4® videogame console or developer kit), comprising physical working memory 100 (such as RAM 1020); an application processor (such as CPU 1010) adapted to run an application; an allocation processor (for example again CPU 1010 under suitable software instruction) adapted to allocate one or more regions of physical working memory for use by an application (i.e. working memory for the application to use during its operation, as opposed to working memory occupied by the application itself), the regions individually comprising contiguous physical memory segments, but the regions not necessarily being contiguous between themselves; a memory manager (for example again CPU 1010 under suitable software instruction) adapted to generate a segment address table 300 (held for example in RAM) having at least as many entries as the total number of physical memory segments allocated to the application; the memory manager being adapted to populate entries of the segment address table sequentially and contiguously with the physical addresses of the physical memory segments across the or each region in order; the memory manager being adapted to present to the application a contiguous virtual addressable space (200) having at least as many virtual memory segments as the total number of physical memory segments allocated to the application; and the memory manager being adapted to map from virtual memory addresses to physical memory addresses by reference to the segment address table.

In an instance of this summary embodiment, the memory manager is adapted to map from virtual memory addresses to physical memory addresses by reference to the segment address table by the process of determining the virtual memory segment comprising the virtual memory address and calculating a virtual address offset with respect to that segment, reading the physical memory addresses held in the entry of the segment address table corresponding to the determined virtual memory segment, and adding the calculated virtual address offset to that physical memory address.

In an instance of this summary embodiment, the allocation processor is adapted to allocate one or more new regions of physical working memory for use by the application, the new regions individually comprising contiguous physical memory segments, but the new regions not necessarily being contiguous between themselves, in response to a request by the application processor for more physical working memory, and the memory manager is adapted to populate entries of the segment address table sequentially and contiguously with the physical addresses of the physical memory segments across the or each new region in order starting with the entry immediately following the last entry in the segment address table corresponding to the existing allocated regions of physical working memory.

In an instance of this summary embodiment, the memory manager is adapted to select the same virtual start address for the virtual address space each time the application is allocated physical working memory.

In an instance of this summary embodiment, for respective applications with respective allocated physical working memory, each application has a respective segment address table and virtual addressable space, and the memory manager does not check for clashes between addresses of physical memory segments between segment address tables.

It will be appreciated that the above apparatus and techniques improve the operation of a computer in a manner that is independent of the particular application that has been presented with the virtual addressable space.

The invention claimed is:

1. A method of memory allocation in a host computer, comprising the steps of:
   allocating regions of physical working memory for use by an application, the regions of physical working memory individually comprising contiguous physical memory segments, and the regions of physical working memory including at least two regions of physical working memory not being contiguous between themselves, such that each physical memory segment is ordered in the physical memory in a sequence from a lowest location to a highest location with at least two of the physical memory segments that are successively ordered in the sequence from the lowest location to the highest location not being in contiguous regions of the physical working memory;
   generating a segment address table having at least as many entries as a total number of physical memory segments within the regions of the physical working memory allocated to the application, where each of the entries of the segment address table has a respective segment number in order according to the sequence;
   populating at least some of the plurality of entries of the segment address table sequentially and contiguously with only respective physical memory addresses of the physical memory segments contained in the regions of the physical working memory, in order in the sequence, including populating a respective entry of the segment address table with only a respective physical memory address of one of the physical memory segments contained in the regions of the physical working memory;
   presenting to the application a virtual addressable space having at least as many virtual memory segments as the total number of physical memory segments within the regions of the physical working memory allocated to the application, where each of the virtual memory segments are sequential and contiguous; and
   mapping from virtual memory addresses of the virtual memory segments to the physical memory addresses of the physical memory segments by reference to the segment address table by carrying out actions, for each mapping, including:
   determining the segment number of one of the virtual memory segments comprising one of the virtual memory addresses being mapped;
   calculating a virtual address offset for the one of the virtual memory segments;
   reading one of the physical memory addresses that is contained in one of the entries of the segment address table having the segment number of the one of the virtual memory segments comprising the one of the virtual memory addresses being mapped; and
   adding the virtual address offset to the one of the physical memory addresses.

2. The method of memory allocation of claim 1, in which in the step of populating the segment address table, a first entry of the segment address table is populated with a first physical memory address, among the respective physical memory addresses, of a first physical memory segment of a first region among the regions.

3. The method of claim 1, wherein when one or more regions of the physical working memory are allocated starting at an address other than a start address of a physical memory segment, then the method comprises the steps of
   calculating a physical starting address offset with respect to the start address of the physical memory segment for the one or more regions; and
   adding the respective physical starting address offset to a calculated physical memory address in a respective one of the one or more regions.

4. The method of claim 1, wherein the segment address table comprises fields for all available physical memory segments.

5. The method of claim 4, wherein the segment address table comprises fields for potential physical memory segments.

6. The method of claim 1, comprising the steps of:
requesting additional working memory for the application;
allocating one or more new regions of physical working memory for use by the application, the one or more new regions individually comprising new contiguous physical memory segments, but the one or more new regions not necessarily being contiguous between themselves; and
populating entries of the segment address table sequentially and contiguously with the respective physical memory addresses of the physical memory segments for the one or more new regions in order in the sequence, starting with an entry immediately following a last entry in the segment address table corresponding to existing allocated regions of the physical working memory.

7. The method of claim 1, comprising the step of selecting a same virtual start address for the virtual address space each time the application is allocated physical working memory.

8. The method of claim 1, wherein for respective applications with respective allocated physical working memory, each application has a respective segment address table and virtual addressable space.

9. A non-transitory, computer readable recording medium having stored thereon a computer executable program adapted to cause a computer system to perform actions, comprising:
allocating regions of physical working memory for use by an application, the regions of physical working memory individually comprising contiguous physical memory segments, and the regions of physical working memory including at least two regions of physical working memory not being contiguous between themselves, such that each physical memory segment is ordered in the physical memory in a sequence from a lowest location to a highest location with at least two of the physical memory segments that are successively ordered in the sequence from the lowest location to the highest location not being in contiguous regions of the physical working memory;
generating a segment address table having at least as many entries as a total number of physical memory segments within the regions of the physical working memory allocated to the application, where each of the entries of the segment address table has a respective segment number in order according to the sequence;
populating at least some of the plurality of entries of the segment address table sequentially and contiguously with only respective physical memory addresses of the physical memory segments contained in the regions of the physical working memory, in order in the sequence, including populating a respective entry of the segment address table with only a respective physical memory address of one of the physical memory segments contained in the regions of the physical working memory;
presenting to the application a virtual addressable space having at least as many virtual memory segments as the total number of physical memory segments within the regions of the physical working memory allocated to the application, where each of the virtual memory segments are sequential and contiguous; and
mapping from virtual memory addresses of the virtual memory segments to the physical memory addresses of the physical memory segments by reference to the segment address table by carrying out actions, for each mapping, including:
determining the segment number of one of the virtual memory segments comprising one of the virtual memory addresses being mapped;
calculating a virtual address offset for the one of the virtual memory segments;
reading one of the physical memory addresses that is contained in one of the entries of the segment address table having the segment number of the one of the virtual memory segments comprising the one of the virtual memory addresses being mapped; and
adding the virtual address offset to the one of the physical memory addresses.

10. A memory allocation apparatus, comprising physical working memory;
an application processor adapted to run an application;
an allocation processor adapted to allocate regions of physical working memory for use by an application, the regions of physical working memory individually comprising contiguous physical memory segments, and the regions of physical working memory including at least two regions of physical working memory not being contiguous between themselves, such that each physical memory segment is ordered in the physical memory in a sequence from a lowest location to a highest location with at least two of the physical memory segments that are successively ordered in the sequence from the lowest location to the highest location not being in contiguous regions of the physical working memory;
a memory manager adapted to generate a segment address table having at least as many entries as a total number of physical memory segments within the regions of the physical working memory allocated to the application, where each of the entries of the segment address table has a respective segment number in order according to the sequence;
the memory manager being adapted to populate at least some of the plurality of entries of the segment address table sequentially and contiguously with only respective physical memory addresses of the physical memory segments contained in the regions of the physical working memory, in order in the sequence, the memory manager being adapted to populate a respective entry of the segment address table with only a respective physical memory address of one of the physical memory segments contained in the regions of the physical working memory;
the memory manager being adapted to present to the application a virtual addressable space having at least as many virtual memory segments as the total number of physical memory segments within regions of the physical working memory allocated to the application, where each of the virtual memory segments are sequential and contiguous; and
the memory manager being adapted to map from virtual memory addresses of the virtual memory segments to the physical memory addresses of the physical memory segments by reference to the segment address table by carrying out actions, for each mapping, including:
determining the segment number of one of the virtual memory segments comprising one of the virtual memory addresses being mapped;
calculating a virtual address offset for the one of the virtual memory segments;
reading one of the physical memory addresses that is contained in one of the entries of the segment address table having the segment number of the one of the virtual memory segments comprising the one of the virtual memory addresses being mapped; and adding the virtual address offset to the one of the physical memory addresses.

11. The memory allocation apparatus of claim 10 in which the allocation processor is adapted to allocate one or more new regions of physical working memory for use by the application, the one or more new regions individually comprising new contiguous physical memory segments, but the one or more new regions not necessarily being contiguous between themselves, in response to a request by the application processor for more physical working memory; and the memory manager is adapted to populate entries of the segment address table sequentially and contiguously with the respective physical memory addresses of the physical memory segments for the one or more new regions in order in the sequence, starting with an entry immediately following a last entry in the segment address table corresponding to existing allocated regions of the physical working memory.

12. The memory allocation apparatus of claim 10, in which the memory manager is adapted to select a same virtual start address for the virtual address space each time the application is allocated physical working memory.

13. The memory allocation apparatus of claim 10, wherein for respective applications with respective allocated physical working memory, each application has a respective segment address table and virtual addressable space; and the memory manager does not check for clashes between addresses of physical memory segments between segment address tables.

\* \* \* \* \*